United States Patent [19]

Marini et al.

[11] Patent Number: 4,761,259

[45] Date of Patent: Aug. 2, 1988

[54] DEVICE FOR THE DETECTION OF A GASEOUS PHASE IN A NUCLEAR REACTOR

[75] Inventors: Jean Marini, Marly-Le-Roi; Jean-Claude Weilbacher, Champagne-Sur-Oise, both of France

[73] Assignee: Framatome, Courbevoie, France

[21] Appl. No.: 318,546

[22] Filed: Nov. 5, 1981

[30] Foreign Application Priority Data

Nov. 20, 1980 [FR] France ................................ 80 24684

[51] Int. Cl.⁴ ............................................. G21C 17/00
[52] U.S. Cl. ..................................... 376/245; 376/256
[58] Field of Search ....................... 376/245, 256, 252; 73/290 V, 19, 24, 59

[56] References Cited

U.S. PATENT DOCUMENTS

| | | | |
|---|---|---|---|
| 3,224,250 | 12/1965 | Ming et al. ................ | 73/290 V |
| 3,240,674 | 3/1966 | Ledwidge ..................... | 376/245 |
| 3,264,863 | 8/1966 | Maropis ....................... | 376/245 |
| 3,753,852 | 8/1973 | Scott et al. .................. | 376/252 |
| 3,945,245 | 3/1976 | Stehle et al. ................ | 376/252 |
| 4,063,457 | 12/1977 | Zekulin et al. ............... | 73/290 V |
| 4,083,225 | 4/1978 | Pay et al. .................... | 73/19 |
| 4,157,036 | 6/1979 | Kivenson ..................... | 73/59 |
| 4,220,040 | 9/1980 | Noguchi et al. ............. | 73/24 |
| 4,341,116 | 7/1982 | Bilstad et al. ............... | 73/290 V |

FOREIGN PATENT DOCUMENTS 53-65778  6/1978  Japan ................................ 376/252

*Primary Examiner*—Salvatore Cangialosi
*Attorney, Agent, or Firm*—Pollock, Vande Sande & Priddy

[57] ABSTRACT

A device for detecting the presence of a gaseous phase in the tank of a nuclear reactor closed by a cover on which a plurality of vertical tubes are fixed for adapting the control rod actuating mechanism of the reactor, the adapter tubes not provided with mechanisms being closed by a plug. A plurality of ultrasonic emitter-receivers are fixed to the upper surface of the plugs of at least a part of the adapter tubes, so that each emitter-receiver directs an ultrasonic beam to the inside of the tank parallel to the axis of the corresponding tube, the latter being provided with at least one reflector placed inside the tube in the path of the ultrasonic beam. The invention is especially applicable to reactors cooled by pressurized water.

7 Claims, 2 Drawing Sheets

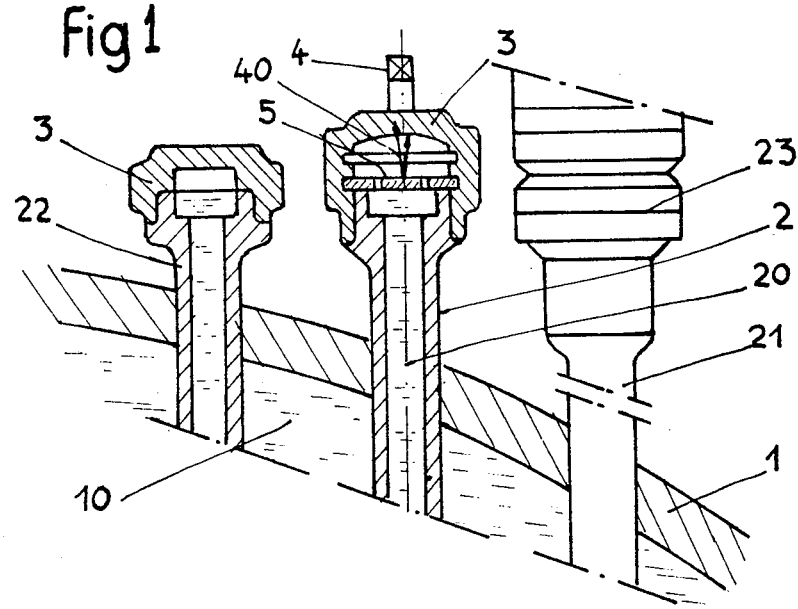
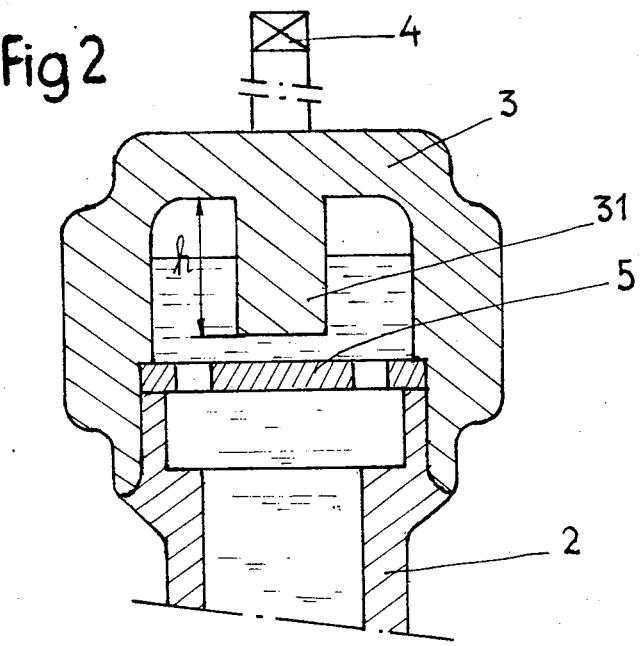

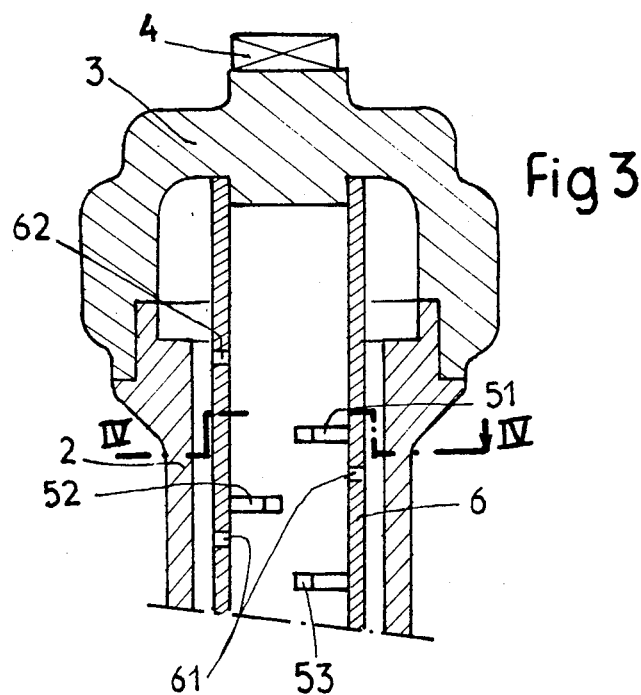
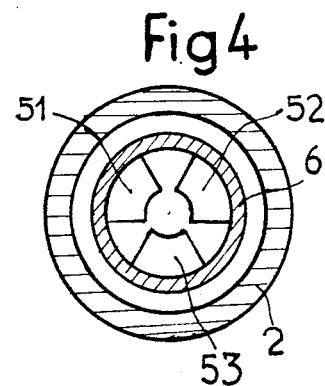
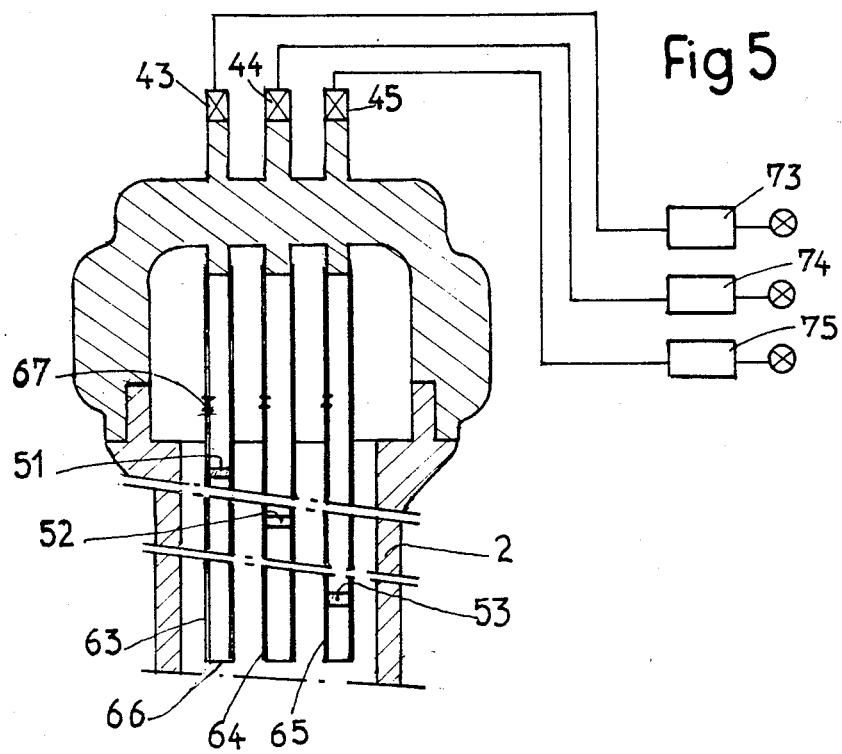

DEVICE FOR THE DETECTION OF A GASEOUS PHASE IN A NUCLEAR REACTOR

FIELD OF THE INVENTION

The invention relates to a device for detecting the presence of a gaseous phase in the tank of a nuclear reactor.

In the operation of a nuclear reactor under power, particularly of the pressurized water-cooled type, the primary fluid is kept at a pressure above saturation pressure by the action of a pressurizer in which the water and the steam are kept in equilibrium at the desired pressure. This maintenance of the primary pressure during constant steady state operation and the absorption of pressure variations during transient states are effected by the invervention of heating systems, by the heating tubes of the pressurizer or by condensation by spraying relatively cold fluid into the vapor phase of the pressurizer.

In normal operation, therefore, steam should be present only in the primary circuit in the pressurizer. If this is not the case and vapor or fission gas bubbles occur, consequently creating a gaseous phase in the primary circuit, this corresponds to abnormal operation which must be detected.

In fact, if due to overheating, thermodynamic conditions are modified and a gaseous phase is created, the fuel elements will be less well cooled and there will be a risk of sheath rupters. Such sheath ruptures will in turn cause release of gaseous fission products which contribute also to the increase of the gases in the pressurized vessel and the acceleration of the process of degradation between normal and abnormal operation.

If, for another reason resulting from accidental conditions, a rise in pressure in the primary circuit causes the opening of the discharge valve of the pressurizer and the latter does not close completely, it may happen that water escapes from the primary circuit and that a vapor bubble is accidentally formed in the tank, by the effect of depressurization of the primary circuit.

It is necessary in the case of such an accident that the operators in the control room be warned as soon as possible that the primary circuit contains a vapor phase, so that they may be enabled to judge the operating procedure and the actions to be taken.

BACKGROUND OF THE INVENTION

In order to have an indication of the water level in the tank in these abnormal conditions, it has been proposed to provide instrumentation on the cover of the tank by means of the usual water level detection devices, for example, ultrasonic emitter-receivers. However, this instrumentation is difficult to realize on account of the thickness of the cover and must be capable of withstanding the same physical conditions as the latter, in particular, high pressure and temperature.

It is an object of the invention to provide a device which overcomes this problem.

It is a further object to provide a device which enables the use for this purpose of certain adapter tubes of the actuacting mechanisms of the control rods.

It is in fact known that the cover of the reactor tank is traversed by a certain number of vertical tubes of inconel welded to the cover and to the upper part to which the actuating mechanisms of the control rods are adapted.

Normally, all the adapter tubes are not used at the same time and those which are not provided with actuating mechanisms are each closed by a plug, enabling the fluid tightness of the tank to be preserved.

GENERAL DESCRIPTION OF THE INVENTION

According to the invention, there is provided a detection device comprising a plurality of ultrasonic emitters fixed to the upper surface of the plugs of at least a part of the adapter tubes so that each emitter-receiver directs an ultrasonic beam into the tank parallel to the axis of the corresponding tube, the latter being provided with at least one receiver positioned within the tube in the path of the ultrasonic beam.

The arrangement according to the invention enables the detection of the presence of a gaseous phase in the tank since, as soon as it appears, it is manifested by the creation of bubbles of which certain ones become localized inside the instrumented adapters. The ultrasonic beam is hence hidden by this gas, which is manifested by a reduction in the echo.

The invention will be better understood by referring to the accompanying drawings which show diagrammatically several embodiments.

BRIEF DESCRIPTION OF THE DRAWINGS

FIG. 1 shows a part of the cover of a reactor tank provided with adapter tubes.

FIGS. 2 to 3 and 5 are partial views in axial section of various modifications of the device according to the invention.

FIG. 4 is a cross-section along the line IV—IV of FIG. 3.

DETAILED DESCRIPTION OF THE PREFERRED EMBODIMENTS

FIG. 1, which corresponds to the simplest embodiment, shows diagramatically a part of the cover 1 of the tank of a nuclear reactor which is traversed by a certain number of adapter tubes such as 2, 21 and 22.

Certain of these tubes, such as 21, are provided with actuating mechanisms 23 which are well known and have not been shown in detail.

The other tubes, such as 22, are provided normally with a cover 3.

According to the invention, on the cover 3 of certain adapter tubes such as 2, an ultrasonic emitter-receiver 4 is fitted which emits an ultrasonic beam 40 parallel to the axis 20 of the tube towards the inside of the reactor.

Within the tube 2 is positioned a reflector 5 which covers at least a portion of the cross-section of the tube 2. Thus, at least a portion of the beam 40 is reflected towards the receiver 4 and gives an echo whose amplitude can be measured.

Normally, the interior 10 of the tank is filled with water under pressure in the same way as the interior of tube 2 which communicates at its lower portion with the tank and has, obviously, been purged.

If, for one reason or another, a gaseous phase appears in the tank, bubbles are formed of which certain ones, imprisoned in the tube 2, accumulate at the upper part of the latter.

As soon as the quantity of bubbles is sufficient to fill the upper part of the tube 2, even over a minimum height, the ultrasonic beam reflected by the reflector 5 is hidden by this gas, the result being a reduction in the echo picked up by the emitter-receiver 4; and this variation can actuate a warning signal, virtually from the start of the formation of gas bubbles.

However, it is possible that it may be considered unnecessary to be preoccupied by the formation of a certain minimum quantity of bubbles and that it is desired to give the warning only when a certain quantity of gas has been formed.

In this case, it may be advantageous to use the modified embodiment of FIG. 2 in which cover 3 is provided, in the axis of the emitter-receiver 4, with an extension 31 which serves as a wave guide. This extension 31 has a height h which corresponds to the amount of gas considered normal.

In fact, taking into account the dimensions of the tank and the number and cross-section of the adapter tubes on which the ultrasonic emitters have been mounted, it is possible to determine the volume of gas which can be contained within each adapter tube 2 without needing to worry and to deduce therefrom the height to be given to the wave guide 31. As long as a part of this guide 31 is immersed in the water, the receiver 4 records an echo signal of normal amplitude.

On the other hand, from the moment when the water level drops below the lower level of the wave guide 31, the reflected beam is hidden as previously by the gas, and the amplitude of the echo diminishes.

This diminution can be used to give the warning by any known means.

FIG. 3 shows another modification which enables not only the detection of the presence of a gas, but also estimation of the water level in the tank. To this end, on several reflectors 51, 52, 53 are fixed to the inner wall of the tube 6 at different heights. As has been indicated in FIG. 4, the various reflectors are offset angularly so that each can receive and send a portion of the ultrasonic beam without intercepting the beams corresponding to the other reflectors.

The tube 6 is in communication with the inside of the tube 2 at its lower part and through a certain number of orifices 61, at least an orifice 62 being placed above the highest reflector 51. In this way, the gases which accumulate in the tube 2 can also penetrate inside the tube 6 so as to mask the reflected beam.

Emitter-receiver 4 forms the sum of the signals reflected by the reflectors 51, 52, 53. The amplitude of the echo varies with the extend to which the reflectors are immersed; this enables detection of the level of the water inside the tube 6. In fact, it is possible to calibrate the measuring apparatus in advance so as to know the variation in amplitude of the signal received according to the level of the water.

In the embodiment of FIG. 5, several reflectors of different levels are also used, but each is placed inside a tube 63, 64, 65 and to each tube corresponds a pick-up 43, 44, 45.

The tubes 64, 63, 65 are provided with reflectors 51, 52, 53 placed at different heights, and they penetrate into the adapter tube 2 with which they communicate through their lower parts 66 and through orifices 67 formed above the reflectors.

Each pick-up 43, 44, 45 is connected to a measuring apparatus 73, 74, 75 capable of triggering a signal at the moment when the corresponding reflector 51, 52 53 ceases to be immersed.

We claim:

1. Device for detecting the formation of gaseous bubbles in the tank of a nuclear reactor by means of an ultrasonic emitter-receiver placed at the exterior of said tank, said tank being closed by a cover on which are fixed a plurality of vertical adapter tubes for the control rod actuating mechanisms of said reactor, adapter tubes not provided with mechanisms each being closed by a plug, said device comprising a plurality of ultrasonic emitter receivers fixed to the upper surface of said plugs of at least some of said adapter tubes so that each emitter-receiver directs an ultrasonic beam to the inside of said tank parallel to the axis of the corresponding tube, the latter being provided with at least one reflector placed inside the tube in the path of said ultrasonic beam.

2. Detection device according to claim 1, wherein the inner surface of the plug is provided in the axis of the beam with an extension forming a wave guide and extending over a height corresponding to a certain quantity of gas the presence of which is tolerated inside the adapter tube.

3. Detection device according to claim 1, comprising, inside the adapter tube, a plurality of reflectors placed at different levels.

4. Detection device according to claim 3, wherein the reflectors are associated with a single receiver forming the sum of the echoes received from the group of reflectors.

5. Detection device according to claim 4, wherein the reflectors are fixed to the inner wall of a support tube placed in the axis of the adapter tube and are offset angularly with respect to one another so that each can receive and send ultrasonic beams without intercepting beams corresponding to the other reflectors, said support tube being provided with orifices for communicating with the inside of the adapter tube, one at least of these orifices being placed above the highest reflector.

6. Detection device according to claim 3, comprising, for each adapter tube, a plurality of emitter-receivers each associated with a reflector, said reflectors being placed at different levels.

7. Detection device according to claim 6, wherein each reflector is placed in a support tube fixed to the plug in the axis of the corresponding emitter and of which the wall is provided with at least two orifices communicating with the inside of the adapter tube, one placed above and the other below the reflector.

* * * * *